US010879766B2

(12) United States Patent
Tan (10) Patent No.: US 10,879,766 B2
(45) Date of Patent: Dec. 29, 2020

(54) BICYCLE ELECTRIC POWER GENERATING DEVICE

(71) Applicant: SHIMANO (SINGAPORE) PTE. LTD., Jurong Town (SG)

(72) Inventor: Chun Sing Tan, Jurong Town (SG)

(73) Assignee: SHIMANO (SINGAPORE) PTE. LTD., Jurong Town (SG)

( * ) Notice: Subject to any disclaimer, the term of this patent is extended or adjusted under 35 U.S.C. 154(b) by 203 days.

(21) Appl. No.: 15/937,682

(22) Filed: Mar. 27, 2018

(65) Prior Publication Data

US 2018/0342931 A1 Nov. 29, 2018

(30) Foreign Application Priority Data

May 29, 2017 (JP) ................. 2017-105705

(51) Int. Cl.
| | |
|---|---|
| *H02K 1/27* | (2006.01) |
| *H02K 1/14* | (2006.01) |
| *H02K 7/18* | (2006.01) |
| *B62M 6/65* | (2010.01) |
| *H02K 7/00* | (2006.01) |

(52) U.S. Cl.
CPC ............ *H02K 7/1861* (2013.01); *B62M 6/65* (2013.01); *H02K 1/146* (2013.01); *H02K 1/2706* (2013.01); *H02K 1/2786* (2013.01); *H02K 7/003* (2013.01)

(58) Field of Classification Search
CPC ...... H02K 1/2786; H02K 1/145; H02K 1/141; H02K 1/143; H02K 21/22
USPC ...................................... 310/257, 67 A, 67 R
See application file for complete search history.

(56) References Cited

U.S. PATENT DOCUMENTS

| | | | |
|---|---|---|---|
| 6,492,758 B1 * | 12/2002 | Gianni | H02K 21/22 310/216.059 |
| 7,723,891 B2 | 5/2010 | Rittenhouse | |
| 2006/0250042 A1 * | 11/2006 | Neet | H02K 1/145 310/164 |

(Continued)

FOREIGN PATENT DOCUMENTS

| | | |
|---|---|---|
| CN | 2272164 Y | 1/1998 |
| CN | 102647064 A | 8/2012 |

(Continued)

OTHER PUBLICATIONS

"Phase, n.2." OED Online. Oxford University Press, Dec. 2019. Web. Jan. 14, 2020. (Year: 2020).*

*Primary Examiner* — Thomas Truong
(74) *Attorney, Agent, or Firm* — Global IP Counselors, LLP (57) ABSTRACT

A bicycle electric power generating device includes a shaft member, a rotation body coaxially rotatable relative to the shaft member, an armature provided on one of the shaft member and the rotation body and a magnet having circumferentially arranged poles provided on the other one to rotate relative to the armature. The armature includes a first yoke with at least one first yoke pieces, a second yoke with at least one second yoke pieces, and a coil. The first and second yoke pieces are arranged parallel to an axis of the shaft member so as not to overlap with each other in a circumferential direction of the shaft member. The magnet includes a first magnet facing the first yoke pieces in a radial direction of the shaft member and a second magnet facing the second yoke pieces in the radial direction.

20 Claims, 6 Drawing Sheets

(56) References Cited

U.S. PATENT DOCUMENTS

| | | | |
|---|---|---|---|
| 2013/0113320 A1* | 5/2013 | Calley | H02K 21/145 |
| | | | 310/156.02 |
| 2016/0043599 A1* | 2/2016 | Kinashi | H02K 1/2786 |
| | | | 310/156.08 |

FOREIGN PATENT DOCUMENTS

| | | |
|---|---|---|
| DE | 102 40 704 A1 | 4/2004 |
| DE | 10 2005 020 952 A1 | 11/2006 |
| DE | 10 2015 112 867 A1 | 2/2016 |
| JP | 2013-46538 A | 3/2013 |
| JP | 2014-209832 A | 11/2014 |
| TW | M539180 U | 4/2017 |

* cited by examiner

BICYCLE ELECTRIC POWER GENERATING DEVICE

CROSS-REFERENCE TO RELATED APPLICATIONS

This application claims priority to Japanese Patent Application No. 2017-105705, filed on May 29, 2017. The entire disclosure of Japanese Patent Application No. 2017-105705 is hereby incorporated herein by reference.

BACKGROUND

Field of the Invention

The present invention generally relates to a bicycle electric power generating device.

Background Information

A bicycle electric power generating device known in the prior art is mounted on a bicycle to generate electric power in accordance with driving of the bicycle. Japanese Laid-Open Patent Publication No. 2013-46538 (Patent document 1) describes a bicycle electric power generating device that includes an armature including two yokes engaged with each other so that yoke pieces of the yokes are alternately arranged and a field system facing the yokes.

SUMMARY

There is a demand for a bicycle electric power generating device that is reduced in size in a radial direction of the device. It is an object of the present invention to provide a bicycle electric power generating device that is reduced in size in the radial direction.

A first aspect of the present invention is a bicycle electric power generating device that includes a shaft member, a rotation body, an armature and a magnet. The rotation body is coaxial with the shaft member and rotatable relative to the shaft member. The armature includes a first yoke, a second yoke and a coil. The first yoke includes one or more first yoke pieces. The second yoke includes one or more second yoke pieces. The armature is provided on one of the shaft member and the rotation body. The magnet is provided on another one of the shaft member and the rotation body to be rotatable relative to the armature. The magnet has poles arranged in a circumferential direction. The first yoke pieces and the second yoke pieces are arranged next to each other in a direction parallel to an axis of the shaft member so as not to overlap with each other in a circumferential direction of the shaft member. The magnet includes a first magnet configured to face the first yoke pieces in a radial direction of the shaft member and a second magnet configured to face the second yoke pieces in the radial direction of the shaft member. With the above structure, the first yoke pieces and the second yoke pieces, each of which faces the magnet, are arranged next to each other in the direction parallel to the axis of the shaft member so as not to overlap with each other in the circumferential direction of the shaft member. This decreases the intervals between the first yoke pieces and the second yoke pieces in the circumferential direction. Thus, the bicycle electric power generating device is reduced in size in the radial direction.

A second aspect of the present invention is a bicycle electric power generating device that includes a shaft member, a rotation body coaxial with the shaft member and rotatable relative to the shaft member, an armature including a first yoke including one or more first yoke pieces, a second yoke including one or more second yoke pieces, and a coil, and the armature being provided on one of the shaft member and the rotation body, and a magnet provided on another one of the shaft member and the rotation body to be rotatable relative to the armature. The magnet has poles arranged in a circumferential direction. The first yoke pieces and the second yoke pieces are arranged next to each other in a direction parallel to an axis of the shaft member. The magnet includes a first magnet configured to face the first yoke pieces in a radial direction of the shaft member and a second magnet configured to face the second yoke pieces in the radial direction of the shaft member. The first magnet and the second magnet are arranged so that the poles of the first magnet are misaligned with the poles of the second magnet in a circumferential direction of the shaft member. With the above structure, the first yoke pieces and the second yoke pieces, each of which faces the magnet, are arranged next to each other in the direction parallel to the axis of the shaft member. Thus, the intervals between the first yoke pieces and the second yoke pieces are decreased in the circumferential direction at locations where the first yoke pieces and the second yoke pieces do not overlap with each other in the circumferential direction of the shaft member. This achieves the reduction in size in the radial direction.

In accordance with a third aspect of the present invention, the bicycle electric power generating device according to the second aspect is configured so that the first yoke pieces and the second yoke pieces are arranged next to each other in the direction parallel to the axis of the shaft member so as not to overlap with each other in the circumferential direction of the shaft member. With the above structure, the bicycle electric power generating device is further reduced in size in the radial direction.

In accordance with a fourth aspect of the present invention, the bicycle electric power generating device according to any one of the first to third aspects is configured so that the first magnet and the second magnet are arranged so that S-poles and N-poles of the first magnet and the second magnet are alternately arranged in the circumferential direction of the shaft member. With the above structure, the power generation amount is increased.

In accordance with a fifth aspect of the present invention, the bicycle electric power generating device according to any one of the first to fourth aspects is configured so that the first yoke pieces are equal in number to the poles of the first magnet, and the second yoke pieces are equal in number to the poles of the second magnet. With the above structure, the power generation amount is increased.

In accordance with a sixth aspect of the present invention, the bicycle electric power generating device according to any one of the first to fifth aspects is configured so that the first yoke pieces are equal in number to the second yoke pieces, and the poles of the first magnet are equal in number to the poles of the second magnet. With the above structure, the first yoke and the second yoke have the same construction. Additionally, the first magnet and the second magnet have the same construction. This simplifies the manufacturing of the bicycle electric power generating device.

In accordance with a seventh aspect of the present invention, the bicycle electric power generating device according to any one of the first to sixth aspects is configured so that the first yoke pieces and the second yoke pieces are located in the same phase in the circumferential direction of the shaft member. With the above structure, the intervals of the first yoke pieces and the second yoke pieces are decreased in the circumferential direction. This allows for increases in the number of the first yoke pieces and the second yoke pieces. Thus, the efficiency for generating power is increased. Additionally, the bicycle electric power generating device is further reduced in size in the radial direction.

In accordance with an eighth aspect of the present invention, the bicycle electric power generating device according to any one of the first to seventh aspects is configured so that each of the first yoke pieces includes a first part extending in the direction parallel to the axis of the shaft member, a second part extending in the direction parallel to the axis of the shaft member and located at an outer side of the first part in the radial direction of the shaft member, and a third part extending in the radial direction of the shaft member to connect one end of the first part and one end of the second part. The coil is located in a position surrounded by the first part, the second part, and the third part. With the above structure, the space defined by the first yoke pieces is effectively used. Additionally, as compared to a case where the coil is misaligned with the first yoke pieces in the axial direction, the bicycle electric power generating device is reduced in size in the axial direction.

In accordance with a ninth aspect of the present invention, the bicycle electric power generating device according to the eighth aspect is configured so that each of the second yoke pieces includes a fourth part extending in the direction parallel to the axis of the shaft member, a fifth part extending in the direction parallel to the axis of the shaft member and located at an outer side of the fourth part in the radial direction of the shaft member, and a sixth part extending in the radial direction of the shaft member to connect one end of the fourth part and one end of the fifth part. The coil is located in a position surrounded by the fourth part, the fifth part, and the sixth part. The first yoke piece and the second yoke piece are arranged so that a further end of the second part of the first yoke piece and a further end of the fifth part of the second yoke piece are arranged next to each other in the direction parallel to the axis of the shaft member. With the above structure, the space defined by the second yoke pieces is effectively used. Additionally, as compared to a case where the coil is misaligned with the second yoke pieces in the axial direction, the bicycle electric power generating device is reduced in size in the axial direction.

In accordance with a tenth aspect of the present invention, the bicycle electric power generating device according to the ninth aspect is configured so that the further end of the second part of the first yoke piece and the further end of the fifth part of the second yoke piece are electrically insulated from each other. With the above structure, electric power is stably generated.

In accordance with an eleventh aspect of the present invention, the bicycle electric power generating device according to the tenth aspect is configured so that the further end of the second part of the first yoke piece and the further end of the fifth part of the second yoke piece are insulated from each other by a gap. With the above structure, the number of components can be reduced. Additionally, the manufacturing is simplified.

In accordance with a twelfth aspect of the present invention, the bicycle electric power generating device according to any one of the ninth to eleventh aspects is configured so that the first yoke piece is formed separately from the second yoke piece, and a further end of the first part of the first yoke piece and a further end of the fourth part of the second yoke piece are in contact with each other. With the above structure, the efficiency for transmitting the magnetic force between the first yoke pieces and the second yoke pieces will not be decreased.

In accordance with a thirteenth aspect of the present invention, the bicycle electric power generating device according to any one of the ninth to twelfth aspects is configured so that the second yoke includes at least two of the second yoke pieces arranged in the circumferential direction of the shaft member, and the fifth parts of two adjacent ones of the second yoke pieces are separated by a distance that is greater than a dimension of each of the second yoke pieces in the circumferential direction of the shaft member. With the above structure, the fifth parts of adjacent ones of the second yoke pieces do not easily contact each other. This facilitates the manufacturing of the bicycle electric power generating device. Additionally, the dimension of each second yoke piece is decreased in the circumferential direction. This allows for increase in the number of the second yoke pieces. Thus, the efficiency for generating power is increased.

In accordance with a fourteenth aspect of the present invention, the bicycle electric power generating device according to any one of the eighth to thirteenth aspects is configured so that the first yoke includes at least two of the first yoke pieces arranged in the circumferential direction of the shaft member, and the second parts of two adjacent ones of the first yoke pieces are separated by a distance that is greater than a dimension of each of the first yoke pieces in the circumferential direction of the shaft member. With the above structure, the second parts of adjacent ones of the first yoke pieces do not easily contact each other. This facilitates the manufacturing of the bicycle electric power generating device. Additionally, the dimension of each first yoke piece is decreased in the circumferential direction. This allows for increase in the number of the first yoke pieces. Thus, the efficiency for generating power is increased.

In accordance with a fifteenth aspect of the present invention, the bicycle electric power generating device according to any one of the first to fourteenth aspects is configured so that the armature is provided on the shaft member, and the magnet is provided on the rotation body. With the above structure, the structure of a wire connected to the armature is simplified.

In accordance with a sixteenth aspect of the present invention, the bicycle electric power generating device according to any one of the first to fifteenth aspects is configured so that the shaft member is a hub axle, and the rotation body is a hub shell. With the above structure, the bicycle electric power generating device provided on the hub is reduced in size in the radial direction.

The bicycle electric power generating device of the present invention is reduced in size in the radial direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
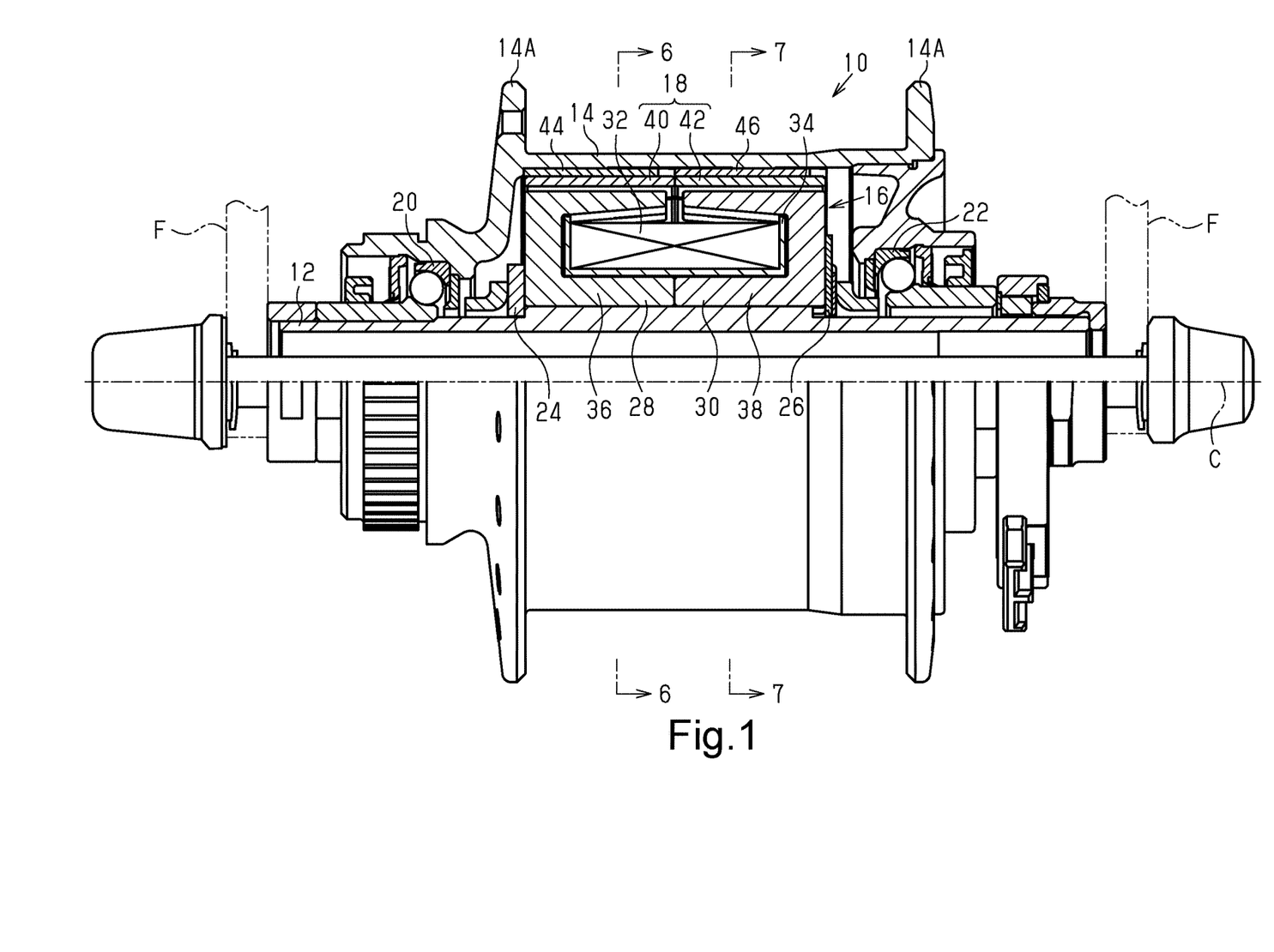
FIG. 1 is a partial cross-sectional view showing of a bicycle electric power generating device in accordance with a first embodiment.

A bicycle electric power generating device configured to be a hub dynamo will now be described with reference to FIGS. 1 to 7. As shown in FIG. 1, a bicycle electric power generating device 10 is a so-called claw-pole type power generator. The bicycle electric power generating device 10 includes a shaft member 12, a rotation body 14, an armature 16 and a magnet 18. The bicycle electric power generating device 10 further includes a first bearing 20, a second bearing 22, a first positioning member 24 and a second positioning member 26.

The shaft member 12 is a hub axle. Two opposite ends of the shaft member 12 in the axial direction are non-rotatably supported by a frame F of a bicycle. The rotation body 14 is a hub shell. The rotation body 14 is coaxial with the shaft member 12 and rotatable relative to the shaft member 12. The rotation body 14 includes a flange 14A located on the outer circumference of the rotation body 14 to be coupled to spokes (not shown) of a front wheel. The rotation body 14 is tubular. The first bearing 20 and the second bearing 22 are provided between the inner circumference of the rotation body 14 and the outer circumference of the shaft member 12. The first bearing 20 is provided on one end portion of the shaft member 12 in the axial direction. The second bearing 22 is provided on the other end portion of the shaft member 12 in the axial direction. The first bearing 20 and the second bearing 22 rotatably support the rotation body 14 with respect to the shaft member 12.

The armature 16 is provided on one of the shaft member 12 and the rotation body 14. In the bicycle electric power generating device 10 shown in FIG. 1, the armature 16 is provided on the shaft member 12. The armature 16 is provided on the outer circumference of the shaft member 12 so as not to rotate relative to the shaft member 12. The armature 16 includes a first yoke 28, a second yoke 30, and a coil 32. The armature 16 further includes a bobbin 34, around which the coil 32 is wound.

Figure 2:
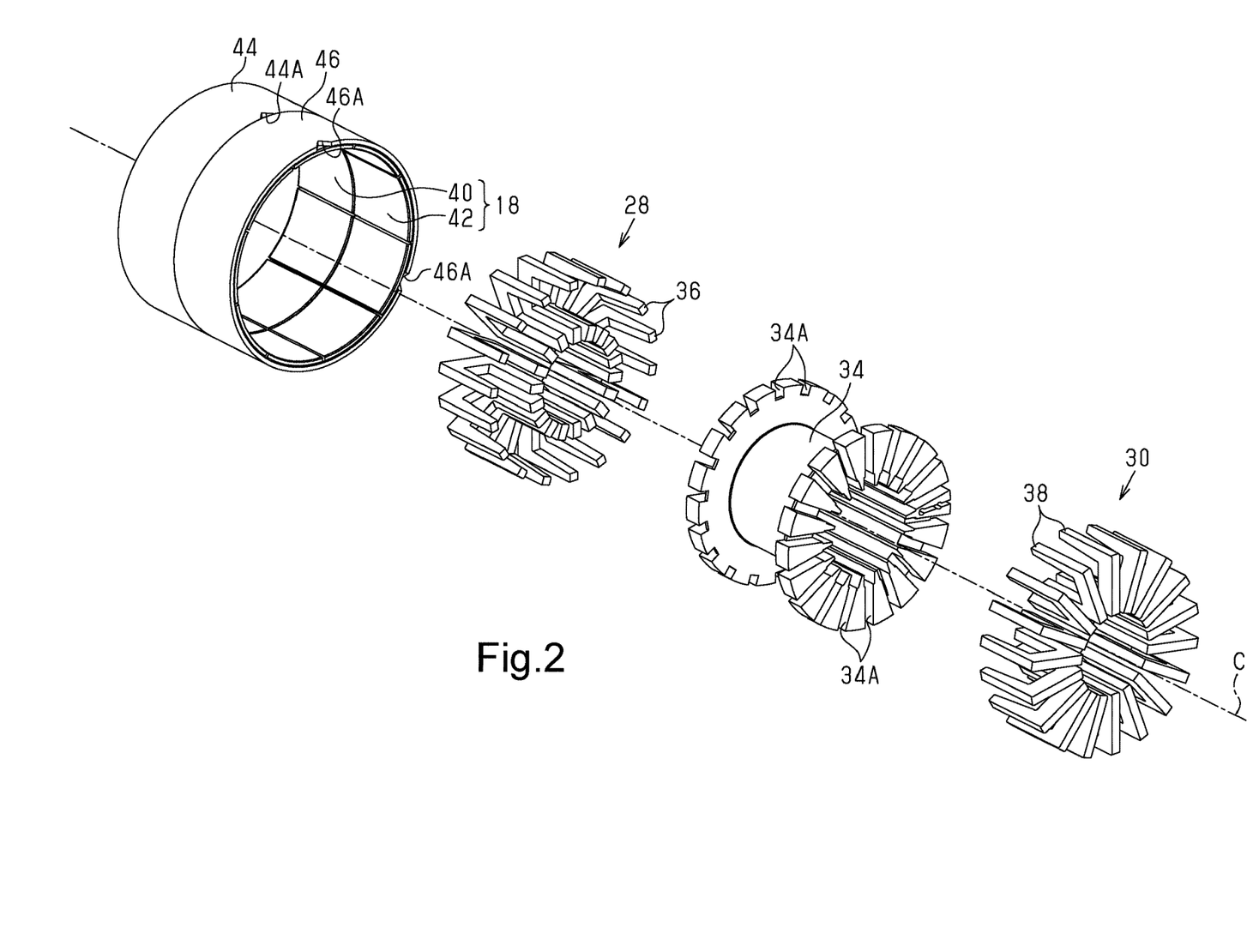
FIG. 2 is an exploded perspective view of the magnet and the armature of the bicycle electric power generating device shown in FIG. 1.
Figure 3:
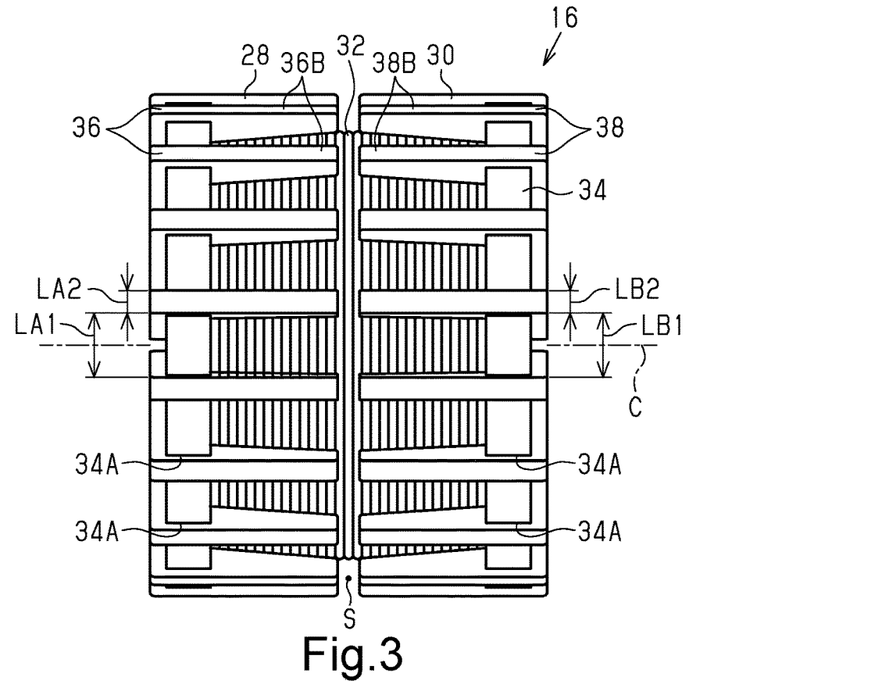
FIG. 3 is a plan view of the armature of the bicycle electric power generating device shown in FIG. 1.

As shown in FIG. 2, the first yoke 28 includes at least one first yoke piece 36. The first yoke 28 includes two or more first yoke pieces 36 arranged in the circumferential direction of the shaft member 12. In one example, the first yoke 28 includes eighteen of the first yoke pieces 36. The first yoke pieces 36 are arranged at equal intervals in the circumferential direction of the shaft member 12. As shown in FIG. 3, the first yoke pieces 36 are fitted into recesses 34A of the bobbin 34 to maintain the positional relationship of the first yoke pieces 36 and the recesses 34A.

Figure 4:
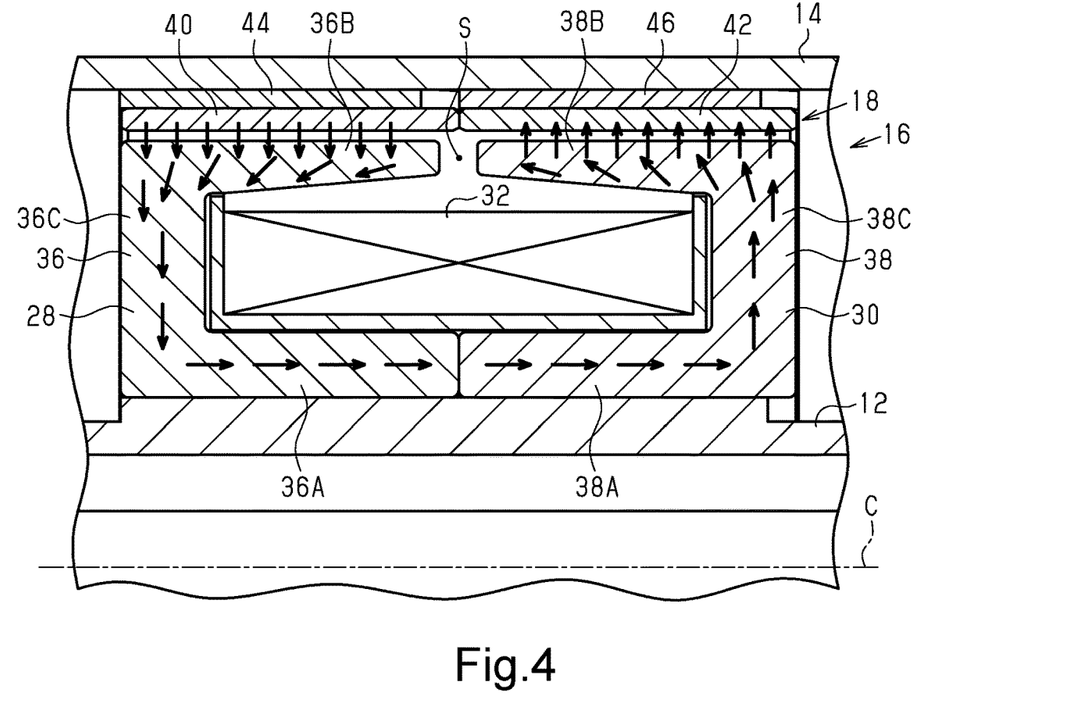
FIG. 4 is an enlarged cross-sectional view of a portion of the bicycle electric power generating device shown in FIG. 1.

As shown in FIG. 4, each of the first yoke pieces 36 is U-shaped. The first yoke piece 36 includes a first part 36A, a second part 36B and a third part 36C. The first part 36A extends in a direction parallel to an axis C of the shaft member 12. The second part 36B extends in the direction parallel to the axis C of the shaft member 12. The second part 36B is located at an outer side of the first part 36A in the radial direction of the shaft member 12. The second part 36B is thinner from a bottom side end toward an opening side end of the U-shaped structure. The third part 36C extends in the radial direction of the shaft member 12 to connect one end of the first part 36A and one end of the second part 36B. It is preferred that the first part 36A, the second part 36B and the third part 36C be formed integrally with each other. It is preferred that the first yoke pieces 36 be formed by stacked magnetic bodies. As shown in FIG. 3, the second parts 36B of two adjacent ones of the first yoke pieces 36 are separated by a distance LA1 that is greater than a dimension LA2 of the first yoke piece 36 in the circumferential direction of the shaft member 12.

As shown in FIG. 2, the second yoke 30 includes at least one second yoke piece 38. The second yoke 30 includes two or more second yoke pieces 38 arranged in the circumferential direction of the shaft member 12. In one example, the second yoke 30 includes eighteen of the second yoke pieces 38. The first yoke pieces 36 are formed separately from the second yoke pieces 38. It is preferred that the first yoke pieces 36 and the second yoke pieces 38 be formed by the same material. It is preferred that the first yoke pieces 36 and the second yoke pieces 38 have the same shape. The number of the first yoke pieces 36 is equal to the number of the second yoke pieces 38. The second yoke pieces 38 are arranged at equal intervals in the circumferential direction of the shaft member 12. As shown in FIG. 3, the second yoke pieces 38 are fitted into the recesses 34A of the bobbin 34 to maintain the positional relationship of the second yoke pieces 38 and the recesses 34A.

As shown in FIG. 4, each of the second yoke pieces 38 is U-shaped. The second yoke piece 38 includes a fourth part 38A, a fifth part 38B and a sixth part 38C. The fourth part 38A extends in the direction parallel to the axis C of the shaft member 12. The fifth part 38B extends in the direction parallel to the axis C of the shaft member 12. The fifth part 38B is located at an outer side of the fourth part 38A in the radial direction of the shaft member 12. The fifth part 38B is thinner from a bottom side end toward an opening side end of the U-shaped structure. The sixth part 38C extends in the radial direction of the shaft member 12 to connect one end of the fourth part 38A and one end of the fifth part 38B. It is preferred that the fourth part 38A, the fifth part 38B and the sixth part 38C be formed integrally with each other. It is preferred that the second yoke pieces 38 be formed by stacked magnetic bodies. As shown in FIG. 3, the fifth parts 38B of two adjacent ones of the second yoke pieces 38 are separated by a distance LB1 that is greater than a dimension LB2 of the second yoke piece 38 in the circumferential direction of the shaft member 12.

As shown in FIG. 3, the first yoke pieces 36 and the second yoke pieces 38 are arranged next to each other in the direction parallel to the axis C of the shaft member 12. The first yoke pieces 36 and the second yoke pieces 38 are arranged next to each other in the direction parallel to the axis C of the shaft member 12 so as not to overlap with each other in the circumferential direction of the shaft member 12. The first yoke pieces 36 and the second yoke pieces 38 are located in the same phase in the circumferential direction of the shaft member 12. The first yoke pieces 36 and the second yoke pieces 38 are held by the bobbin 34 to be symmetrical in the axial direction so that the openings of the U-shaped structures of the first yoke pieces 36 and the second yoke pieces 38 face each other.

As shown in FIG. 4, the first yoke piece 36 and the second yoke piece 38 are arranged so that a further end of the second part 36B of the first yoke piece 36 and a further end of the fifth part 38B of the second yoke piece 38 are arranged in the direction parallel to the axis C of the shaft member 12. The further end of the second part 36B of the first yoke piece 36 and the further end of the fifth part 38B of the second yoke piece 38 are electrically insulated from each other. The further end of the second part 36B of the first yoke piece 36 and the further end of the fifth part 38B of the second yoke piece 38 are insulated by a gap S. A further end of the first part 36A of the first yoke piece 36 and a further end of the fourth part 38A of the second yoke piece 38 are in contact with each other. Thus, the first part 36A of the first yoke piece 36 and the fourth part 38A of the second yoke piece 38 are continuous with each other.

The coil 32 is located in a position surrounded by the first part 36A, the second part 36B, and the third part 36C. The coil 32 is located in a position surrounded by the fourth part 38A, the fifth part 38B and the sixth part 38C. More specifically, the coil 32 is located between the outer circumference of the bobbin 34 and the second parts 36B of the first yoke pieces 36 and the fifth parts 38B of the second yoke pieces 38. The coil 32 is wound around the outer circumference of the bobbin 34.

The first positioning member 24 shown in FIG. 1 is annular. The first positioning member 24 is fitted onto the shaft member 12. The first positioning member 24 is coupled to one end of the armature 16 to restrict movement of the armature 16 in the axial direction. The second positioning member 26 is fitted onto the shaft member 12. The second positioning member 26 is coupled to the other end of the armature 16 to restrict movement of the armature 16 in the axial direction.

As shown in FIGS. 1 and 2, the magnet 18 is provided on a further one of the shaft member 12 and the rotation body 14 to be rotatable relative to the armature 16. The magnet 18 has poles arranged in the circumferential direction. In the bicycle electric power generating device 10 shown in FIG. 1, the magnet 18 is provided on the rotation body 14. The magnet 18 is provided on the inner circumference of the rotation body 14 so as not to rotate relative to the rotation body 14.

Figure 5:
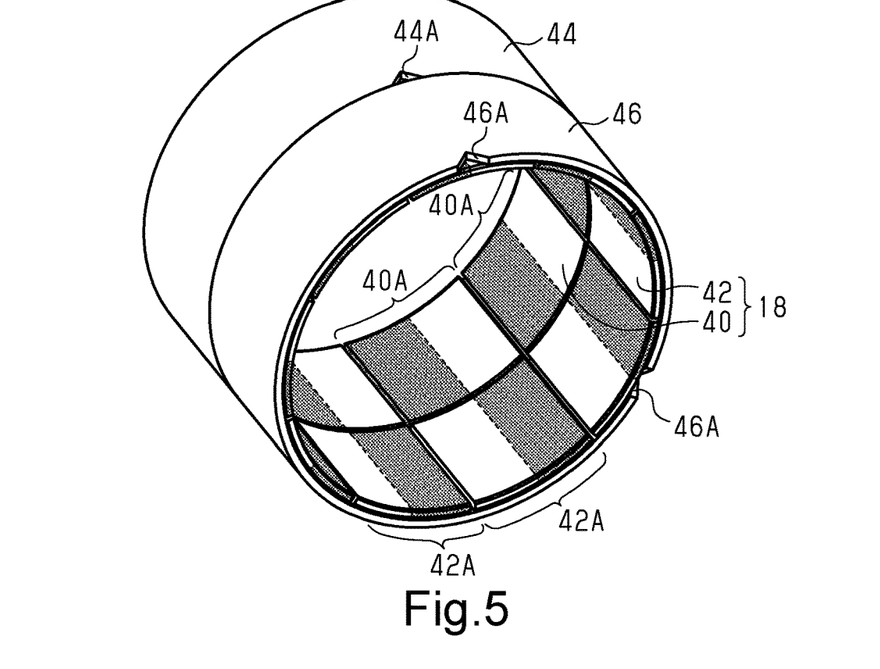
FIG. 5 is a perspective view of the magnet of the bicycle electric power generating device shown in FIG. 1.

As shown in FIG. 5, the magnet 18 includes a first magnet 40 and a second magnet 42. The first magnet 40 is formed by attaching a plurality of magnets 40A to the inner circumference of a tubular first support member 44. The first support member 44 includes a marker 44A. The marker 44A is, for example, a notch formed in an edge of the first support member 44. It is preferred that the dimension of the first magnet 40 in the axial direction of the shaft member 12 be greater than or equal to the dimension of the second part 36B of a first yoke piece 36 in the axial direction. It is preferred that the first magnet 40 be a neodymium magnet. It is preferred that the first magnet 40 be a sintered magnet. However, the first magnet 40 can be a bonded magnet.

The second magnet 42 is formed by attaching a plurality of magnets 42A to the inner circumference of a tubular second support member 46. The second support member 46 includes a marker 46A. The marker 46A is, for example, a notch formed in an edge of the second support member 46. It is preferred that the dimension of the second magnet 42 in the axial direction of the shaft member 12 be greater than or equal to the dimension of the fifth part 38B of a second yoke piece 38 in the axial direction. It is preferred that the second magnet 42 be a neodymium magnet. It is preferred that the second magnet 42 be a sintered magnet. However, the second magnet 42 can be a bonded magnet.

As shown in FIG. 5, the first magnet 40 and the second magnet 42 are arranged so that the poles of the first magnet 40 are misaligned with the poles of the second magnet 42 in the circumferential direction of the shaft member 12. The first magnet 40 and the second magnet 42 are arranged so that S-poles and N-poles of the first magnet 40 and the second magnet 42 are alternately arranged in the circumferential direction of the shaft member 12. Therefore, the S-poles of the first magnet 40 are not aligned with the S-poles of the second magnet 42 and the N-poles of the first magnet 40 are not aligned with the N-poles of the second magnet 42 in the axial direction of the shaft member 12. In a case of coupling the first magnet 40 and the second magnet 42 to the rotation body 14, the marker 44A of the first support member 44 and the marker 46A of the second support member 46 are aligned with each other in the same phase. This alternately arranges the S-poles and the N-poles of the first magnet 40 and the second magnet 42 in the circumferential direction of the shaft member 12.

Figure 6:
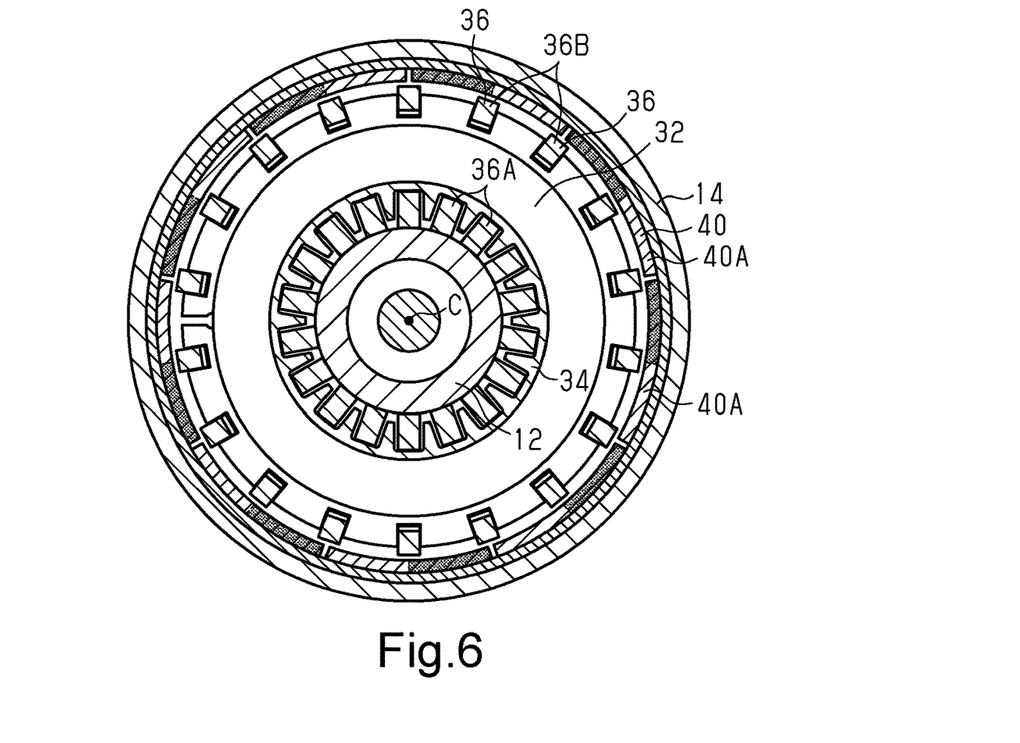
FIG. 6 is a cross-sectional view of the bicycle electric power generating device taken along section line 6-6 in FIG. 1.
Figure 7:
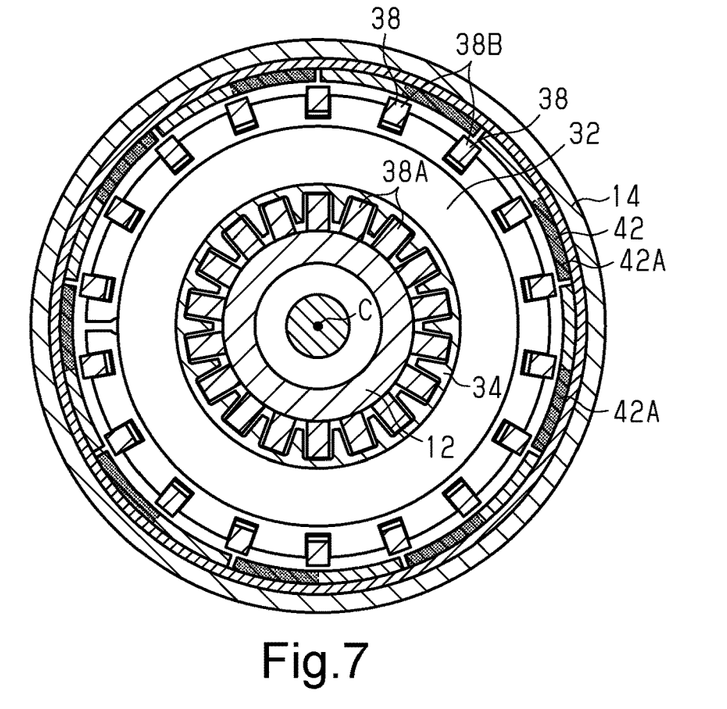
FIG. 7 is a cross-sectional view of the bicycle electric power generating device taken along section line 7-7 in FIG. 1.

As shown in FIG. 6, the first magnet 40 is configured to face the first yoke pieces 36 in the radial direction of the shaft member 12. The number of the first yoke pieces 36 is equal to the number of poles of the first magnet 40. As shown in FIG. 7, the second magnet 42 is configured to face the second yoke pieces 38 in the radial direction of the shaft member 12. The number of the second yoke pieces 38 is equal to the number of poles of the second magnet 42. The number of poles of the first magnet 40 is equal to the number of poles of the second magnet 42.

The arrows in FIG. 4 indicate a magnetic field generated in the bicycle electric power generating device 10. The magnetic force line of the first yoke piece 36 and the second yoke piece 38 shown in FIG. 4 extends from the N-pole of the first magnet 40 to the second part 36B, the third part 36C, and the first part 36A of the first yoke pieces 36 and the fourth part 38A, the sixth part 38C, and the fifth part 38B of the second yoke pieces 38 and then the S-pole of the second magnet 42. In the first yoke piece 36 and the second yoke piece 38 that are located adjacent to the first yoke piece 36 and the second yoke piece 38 shown in FIG. 4 in the circumferential direction, the magnetic force line extends in a direction opposite to the magnetic force line of the first yoke piece 36 and the second yoke piece 38 shown in FIG. 4. Since the first yoke pieces 36 and the second yoke pieces 38 are arranged in the axial direction of the shaft member 12, the magnetic field generated in the bicycle electric power generating device 10 forms a magnetic force line looping on a plane parallel to the axial direction of the shaft member 12.

The operation of the bicycle electric power generating device 10 will now be described with reference to FIG. 3. In the bicycle electric power generating device 10, the first yoke pieces 36 and the second yoke pieces 38, arranged in the circumferential direction, are arranged next to each other in the direction parallel to the axis C of the shaft member 12 so as not to overlap with each other in the circumferential direction of the shaft member 12. Thus, the intervals of the first yoke pieces 36 and the intervals of the second yoke pieces 38 are decreased in the circumferential direction. Therefore, as compared to a structure in which the first yoke pieces 36 and the second yoke pieces 38 are alternately arranged in the circumferential direction, the number of the first yoke pieces 36, the number of the second yoke pieces 38, and the number of poles of the magnet 18 can be increased. This limits reduction in power generation amount even in a case where the bicycle electric power generating device 10 is reduced in size in the radial direction.

Modifications

The description of the above embodiment illustrates one embodiment of a bicycle electric power generating device according to the present invention and is not intended to be restrictive. The bicycle electric power generating device of the present embodiment includes, for example, the following modifications of the above embodiment. Further, two or more of the modifications can be combined. In the modifications, the same reference characters are given to those components that are the same as the corresponding components of the embodiment. Such components will not be described in detail.

Figure 8:
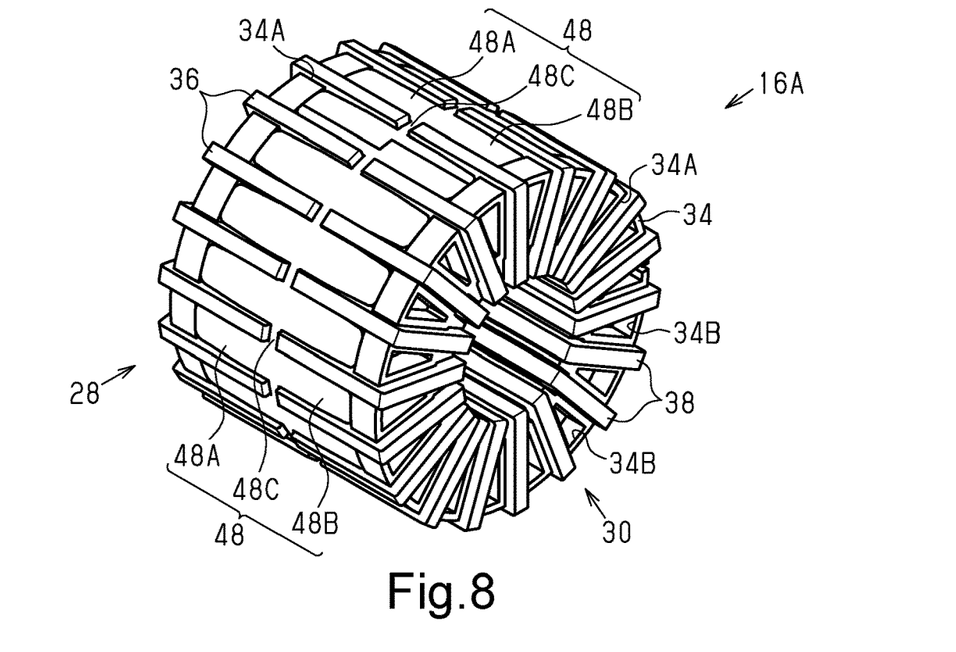
FIG. 8 is a perspective view of a modification of an armature for a bicycle electric power generating device.
Figure 9:
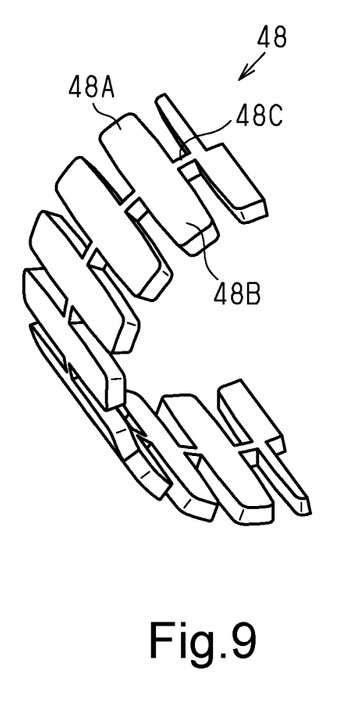
FIG. 9 is a perspective view of an insulation member of the armature shown in FIG. 8.

The further end of the second part 36B of the first yoke piece 36 can be insulated from the further end of the fifth part 38B of the second yoke piece 38 by an insulator. FIG. 8 shows an armature 16A further including two or more insulation members 48. Each insulation member 48 is formed by an insulator. The insulation member 48 includes, for example, a resin material. The insulation member 48 includes a first yoke part 48A, a second yoke part 48B, and an intermediate part 48C. The first yoke part 48A is fitted between the second parts 36B of the first yoke pieces 36 located adjacent to each other in the circumferential direction. The second yoke part 48B is fitted between the fifth parts 38B of the second yoke pieces 38 located adjacent to each other in the circumferential direction. The intermediate part 48C is fitted between the second part 36B of the first yoke piece 36 and the fifth part 38B of the second yoke piece 38. As shown in FIG. 9, the intermediate part 48C connects a plurality of first yoke parts 48A and a plurality of second yoke parts 48B. The two or more insulation members 48 are fitted between the first yoke pieces 36 and the second yoke pieces 38 to insulate the further ends of the second parts 36B of the first yoke pieces 36 from the further ends of the fifth parts 38B of the second yoke pieces 38 with the insulator throughout the circumference of the armature 16A.

The bobbin 34 can include a hollow portion. In FIG. 8, hollow portions 34B are provided in axial ends of the bobbin 34. The hollow portions 34B are provided between adjacent ones of the recesses 34A. The hollow portions 34B can be partially or entirely provided between adjacent ones of the recesses 34A.

The number of poles of the first magnet 40 can differ from the number of the first yoke pieces 36. Also, the number of poles of the second magnet 42 can differ from the number of the second yoke pieces 38. The number of the first yoke pieces 36 can differ from the number of the second yoke pieces 38. In this case, while the number of poles of the first magnet 40 is set to be equal to the number of the first yoke pieces 36 and the number of poles of the second magnet 42 is set to be equal to the number of the second yoke pieces 38, the number of poles of the first magnet 40 can differ from the number of poles of the second magnet 42.

The distance LA1 between the second parts 36B of two adjacent ones of the first yoke pieces 36 can be less than or equal to the dimension LA2 of a first yoke piece 36 in the circumferential direction of the shaft member 12. The distance LB1 between the fifth parts 38B of two adjacent ones of the second yoke pieces 38 can be less than or equal to the dimension LB2 of a second yoke piece 38 in the circumferential direction of the shaft member 12.

The first yoke pieces 36 and the second yoke pieces 38 can be formed integrally with each other. The first yoke pieces 36 and the second yoke pieces 38 can be misaligned with each other in the circumferential direction of the shaft member 12. The first yoke piece 36 and the second yoke piece 38 that face each other in the axial direction of the shaft member 12 are in contact with each other. Instead, the first yoke piece 36 and the second yoke piece 38 that are misaligned with each other in the circumferential direction of the shaft member 12 can be in contact with each other. For example, the first yoke piece 36 and the second yoke piece 38 having the second part 36B and the fifth part 38B that are separated by one pitch in the circumferential direction of the shaft member 12 are in contact with each other. More specifically, the first part 36A of the first yoke piece 36 is arranged to incline toward one side in the circumferential direction from the third part 36C toward the second yoke piece 38. Also, the fourth part 38A of the second yoke piece 38 is arranged to incline toward the other side in the circumferential direction from the sixth part 38C toward the first yoke piece 36. In this case, the poles of the first magnet 40 and the poles of the second magnet 42 can be arranged so that all of the S-poles and the N-poles overlap with each other in the circumferential direction of the shaft member 12. In this case, the first magnet 40 and the second magnet 42 can be formed integrally with each other.

The first yoke pieces 36 and the second yoke pieces 38 can be arranged next to each other in a direction parallel to the axis C of the shaft member 12 so as to partially overlap with each other in the circumferential direction of the shaft member 12. In this case, for example, the further ends of the second parts 36B of some of the first yoke pieces 36 are located closer to the sixth parts 38C of the second yoke pieces 38 than the further ends of the fifth parts 38B of some of the second yoke pieces 38.

The poles of the first magnet 40 and the poles of the second magnet 42 can be arranged so that the S-poles and the N-poles of the first magnet 40 and the second magnet 42 partially or entirely overlap with each other in the circumferential direction of the shaft member 12. At least one of the dimension of each magnet 40A of the first magnet 40 in the circumferential direction and the dimension of each magnet 42A of the second magnet 42 in the circumferential direction can be decreased so that the magnets 40A, 42A are separated from each other in the circumferential direction.

At least one of the first magnet 40 and the second magnet 42 can be formed by magnetizing the support members 44, 46 or the inner circumference of the rotation body 14. The support members 44, 46 can be omitted so that at least one of the first magnet 40 and the second magnet 42 is directly attached to the rotation body 14.

The markers 44A, 46A of the support members 44, 46 can be one of a recess and a projection projecting radially outward from the outer circumferences of the support members 44, 46. In this case, the inner circumference of the rotation body 14 includes the other one of the recess and the projection, to which the one of the recess and the projection is fitted.

The armature 16 can be provided on the rotation body 14, and the magnet 18 can be provided on the shaft member 12. In this case, electric current generated in the armature 16 can be drawn out of the armature 16 via a slip ring.

The bicycle electric power generating device 10 can be provided on a rear wheel hub. Alternatively, the bicycle electric power generating device 10 can be provided on a crankshaft or a shifting device. The present invention is applicable to any component as long as the component is a bicycle component including a shaft member and a rotation body.

What is claimed is:

1. A bicycle electric power generating device comprising:
a shaft member;
a rotation body coaxial with the shaft member and rotatable relative to the shaft member;
an armature including a first yoke including one or more first yoke pieces, a second yoke including one or more second yoke pieces, and a coil, the armature being provided on one of the shaft member and the rotation body; and
a magnet provided on another one of the shaft member and the rotation body to be rotatable relative to the armature, the magnet having poles arranged in a circumferential direction,
the first yoke pieces and the second yoke pieces being arranged next to each other in a direction parallel to an axis of the shaft member so as not to overlap with each other in a circumferential direction of the shaft member,
the magnet including a first magnet configured to face the first yoke pieces in a radial direction of the shaft member and a second magnet configured to face the second yoke pieces in the radial direction of the shaft member, and
at least a portion of each of the first yoke pieces being disposed between the first magnet and the coil in the radial direction, and at least a portion of each of the second yoke pieces being disposed between the second magnet and the coil in the radial direction.

2. The bicycle electric power generating device according to claim 1, wherein
the first magnet and the second magnet are arranged so that S-poles and N-poles of the first magnet and the second magnet are alternately arranged in the circumferential direction of the shaft member.

3. The bicycle electric power generating device according to claim 1, wherein
the first yoke pieces are equal in number to the poles of the first magnet, and
the second yoke pieces are equal in number to the poles of the second magnet.

4. The bicycle electric power generating device according to claim 1, wherein
the first yoke pieces are equal in number to the second yoke pieces, and
the poles of the first magnet are equal in number to the poles of the second magnet.

5. The bicycle electric power generating device according to claim 1, wherein
the first yoke pieces and the second yoke pieces are located in the same phase in the circumferential direction of the shaft member.

6. The bicycle electric power generating device according to claim 1, wherein
the armature is provided on the shaft member, and
the magnet is provided on the rotation body.

7. The bicycle electric power generating device according to claim 1, wherein
the shaft member is a hub axle, and
the rotation body is a hub shell.

8. A bicycle electric power generating device comprising:
a shaft member;
a rotation body coaxial with the shaft member and rotatable relative to the shaft member;
an armature including a first yoke including plurality of first yoke pieces, a second yoke including plurality of second yoke pieces, and a coil, the armature being provided on one of the shaft member and the rotation body; and
a magnet provided on another one of the shaft member and the rotation body to be rotatable relative to the armature, the magnet having poles arranged in a circumferential direction,
the first yoke pieces and the second yoke pieces being arranged next to each other in a direction parallel to an axis of the shaft member,
the magnet being overlapped with the coil in a radial direction of the shaft member including a first magnet configured to face the first yoke pieces in the radial direction and a second magnet configured to face the second yoke pieces in the radial direction, and
the first magnet and the second magnet being arranged so that the poles of the first magnet are misaligned with the poles of the second magnet in a circumferential direction of the shaft member,
the first yoke pieces being arranged in the circumferential direction of the shaft member, and
radially outermost portions of adjacent ones of the first yoke pieces being separated by a distance that is greater than a dimension of each of the first yoke pieces in the circumferential direction of the shaft member.

9. The bicycle electric power generating device according to claim 8, wherein
the first yoke pieces and the second yoke pieces are arranged next to each other in the direction parallel to the axis of the shaft member so as not to overlap with each other in the circumferential direction of the shaft member.

10. The bicycle electric power generating device according to claim 8, wherein
the first magnet and the second magnet are arranged so that S-poles and N-poles of the first magnet and the second magnet are alternately arranged in the circumferential direction of the shaft member.

11. The bicycle electric power generating device according to claim 8, wherein
the first yoke pieces are equal in number to the poles of the first magnet, and
the second yoke pieces are equal in number to the poles of the second magnet.

12. The bicycle electric power generating device according to claim 8, wherein
the first yoke pieces are equal in number to the second yoke pieces, and
the poles of the first magnet are equal in number to the poles of the second magnet.

13. The bicycle electric power generating device according to claim 8, wherein
the first yoke pieces and the second yoke pieces are located in the same phase in the circumferential direction of the shaft member.

14. A bicycle electric power generating device comprising:
a shaft member;
a rotation body coaxial with the shaft member and rotatable relative to the shaft member;
an armature including a first yoke including one or more first yoke pieces, a second yoke including one or more second yoke pieces, a coil, and a bobbin around which the coil is wound, the armature being provided on one of the shaft member and the rotation body;

a magnet provided on another one of the shaft member and the rotation body to be rotatable relative to the armature, the magnet having poles arranged in a circumferential direction;

the first yoke pieces and the second yoke pieces being arranged next to each other in a direction parallel to an axis of the shaft member so as not to overlap with each other in a circumferential direction of the shaft member and the magnet including a first magnet configured to face the first yoke pieces in a radial direction of the shaft member and a second magnet configured to face the second yoke pieces in the radial direction of the shaft member, the first yoke pieces being fitted into recesses of the bobbin, each of the first yoke pieces including a first part extending in the direction parallel to the axis of the shaft member, a second part extending in the direction parallel to the axis of the shaft member and located at an outer side of the first part in the radial direction of the shaft member, and a third part extending in the radial direction of the shaft member to connect one end of the first part and one end of the second part, and the coil being wound onto an outer circumference of the bobbin such that the coil is located in a position surrounded by the first parts, the second parts, and the third parts of the first and second yoke pieces, the coil being disposed between the outer circumference of the bobbin and the second parts of the first and second yoke pieces.

15. The bicycle electric power generating device according to claim 14, wherein each of the second yoke pieces includes a fourth part extending in the direction parallel to the axis of the shaft member, a fifth part extending in the direction parallel to the axis of the shaft member and located at an outer side of the fourth part in the radial direction of the shaft member, and a sixth part extending in the radial direction of the shaft member to connect one end of the fourth part and one end of the fifth part, the coil is located in a position surrounded by the fourth part, the fifth part, and the sixth part, and the first yoke piece and the second yoke piece are arranged so that a further end of the second part of the first yoke piece and a further end of the fifth part of the second yoke piece are arranged next to each other in the direction parallel to the axis of the shaft member.

16. The bicycle electric power generating device according to claim 15, wherein the further end of the second part of the first yoke piece and the further end of the fifth part of the second yoke piece are electrically insulated from each other.

17. The bicycle electric power generating device according to claim 16, wherein the further end of the second part of the first yoke piece and the further end of the fifth part of the second yoke piece are insulated from each other by a gap.

18. The bicycle electric power generating device according to claim 15, wherein the first yoke piece is formed separately from the second yoke piece, and a further end of the first part of the first yoke piece and a further end of the fourth part of the second yoke piece are in contact with each other.

19. The bicycle electric power generating device according to claim 15, wherein the second yoke includes at least two of the second yoke pieces arranged in the circumferential direction of the shaft member, and the fifth parts of two adjacent ones of the second yoke pieces are separated by a distance that is greater than a dimension of each of the second yoke pieces in the circumferential direction of the shaft member.

20. The bicycle electric power generating device according to claim 14, wherein the first yoke includes at least two of the first yoke pieces arranged in the circumferential direction of the shaft member, and the second parts of two adjacent ones of the first yoke pieces are separated by a distance that is greater than a dimension of each of the first yoke pieces in the circumferential direction of the shaft member.

* * * * *